United States Patent
Christian

(10) Patent No.: US 10,246,836 B2
(45) Date of Patent: Apr. 2, 2019

(54) COLD IN-PLACE RECYCLING WITH IN-LINE HEATER FOR ASPHALT CEMENT

(71) Applicant: Roadtec, Inc., Chattanooga, TN (US)

(72) Inventor: Richard Christian, Chattanooga, TN (US)

(73) Assignee: Roadtec, Inc., Chattanooga, TN (US)

( * ) Notice: Subject to any disclaimer, the term of this patent is extended or adjusted under 35 U.S.C. 154(b) by 0 days.

(21) Appl. No.: 15/855,403

(22) Filed: Dec. 27, 2017

(65) Prior Publication Data
US 2018/0187384 A1 Jul. 5, 2018

Related U.S. Application Data

(60) Provisional application No. 62/441,631, filed on Jan. 3, 2017.

(51) Int. Cl.
*E01C 19/00* (2006.01)
*E01C 23/06* (2006.01)
(Continued)

(52) U.S. Cl.
CPC ............ *E01C 23/065* (2013.01); *C10C 3/002* (2013.01); *E01C 11/005* (2013.01); *E01C 23/12* (2013.01); *F24H 8/00* (2013.01); *F28D 7/024* (2013.01); *F28D 7/026* (2013.01); *F28D 9/0068* (2013.01); *E01C 19/05* (2013.01); *E01C 19/08* (2013.01); *E01C 19/1004* (2013.01); *F28D 2021/0024* (2013.01)

(58) Field of Classification Search
CPC ........ E01C 23/065; E01C 23/12; E01C 19/05;
E01C 19/08; E01C 11/005; E01C 19/1004; C10C 3/002; F24H 8/00; F28D 7/024; F28D 7/026; F28D 9/0068; F28D 2021/0024
USPC ................... 404/84.05, 79, 95, 101, 111, 118
See application file for complete search history.

(56) References Cited

U.S. PATENT DOCUMENTS 3,016,809 A * 1/1962 McNeill .................. E01C 19/21
239/119
3,477,412 A 11/1969 Kitrilakis
(Continued)

OTHER PUBLICATIONS

International Search Report and Written Opinion of Counterpart PCT Application No. PCT/2017/68521 filed Dec. 27, 2017.
(Continued)

*Primary Examiner* — Raymond W Addie
(74) *Attorney, Agent, or Firm* — Chambliss, Bahner & Stophel, P.C.

(57) ABSTRACT

A CIR train that is adapted to traverse a roadway of asphalt pavement in order to recycle and repair the asphalt pavement includes a milling machine for removing asphalt paving material from the roadway. The CIR train also includes an asphalt cement supply tank and a mechanism for dispensing asphalt cement onto asphalt paving material that has been removed from the roadway. A heater is in fluid communication with the asphalt cement supply tank and the mechanism for dispensing asphalt cement on the asphalt paving material that has been removed from the roadway. The heater is adapted to heat the asphalt cement from the asphalt cement supply tank prior to said asphalt cement being dispensed on the asphalt paving material that has been removed from the roadway.

13 Claims, 12 Drawing Sheets

(51) Int. Cl.
*E01C 23/12* (2006.01)
*E01C 11/00* (2006.01)
*C10C 3/00* (2006.01)
*F24H 8/00* (2006.01)
*F28D 7/02* (2006.01)
*F28D 9/00* (2006.01)
*E01C 19/05* (2006.01)
*E01C 19/08* (2006.01)
*E01C 19/10* (2006.01)
*F28D 21/00* (2006.01)

(56) References Cited

U.S. PATENT DOCUMENTS

| | | |
|---|---|---|
| 3,845,941 A | 11/1974 | Mendenhall |
| 5,219,450 A | 6/1993 | Thurk |
| 9,841,244 B2* | 12/2017 | Boehm ............... B21D 11/06 |
| 2003/0194273 A1 | 10/2003 | Lloyd |
| 2011/0120443 A1* | 5/2011 | Stothert ............ E01C 23/065 |
| | | 126/271.2 A |
| 2013/0008635 A1 | 1/2013 | Alessandrini |
| 2016/0108586 A1* | 4/2016 | Huhn ................ E01C 23/065 |
| | | 404/90 |

OTHER PUBLICATIONS

Co-Pending Application—Invitation to Pay Additional Fees of counterpart PCT Application No. PCT/US17/68521 dated Apr. 4, 2018.

* cited by examiner

COLD IN-PLACE RECYCLING WITH IN-LINE HEATER FOR ASPHALT CEMENT

CROSS-REFERENCE TO RELATED APPLICATION

This application claims the benefit of U.S. Provisional Patent Application No. 62/441,631 which was filed on Jan. 3, 2017.

FIELD OF THE INVENTION

The present invention relates generally to repair and repaving of roadways with asphalt paving material. More particularly, the invention relates to equipment for use in cold in-place repaving of roadways with recycled asphalt material.

BACKGROUND OF THE INVENTION

Roadway repair is often accomplished by overlaying the existing pavement (whether of concrete or asphalt paving material) with a new layer (often called a leveling course) of concrete or asphalt paving material. Without prior surface treatment, however, this method of repair generally results in the application of insufficient quantities of paving material in the rutted, potholed or otherwise damaged areas, because the overlay will be applied at the same rate per unit of roadway width in damaged areas (which have a greater depth to be filled across the width) as in the undamaged areas. The resulting reduced density in the overlay of the previously damaged areas will lead to renewed rutting or other wear damage in the new pavement in relatively short order. However, by milling the surface of the damaged pavement to a uniform surface elevation below the level of the damage, the addition of new pavement will produce a road surface having a consistent elevation across the entire width of the roadway. This repaving technique can be used to return the elevation of a damaged roadway to its original pre-damaged elevation, whereas the placement of a leveling course atop damaged but un-milled pavement will tend to raise the surface of the roadway or some portion thereof above its original elevation. Roadway repair without milling can require the raising of road shoulders, guardrails and manhole covers and the adjustment of overpass clearances, all of which is unnecessary if a proper milling technique is employed. A use of milling prior to repaving can also permit ready establishment of the proper road grade and slope, and thereby avoid drainage and safety problems. Furthermore, milling typically provides a rough surface that readily accepts and bonds with the new asphalt or other pavement overlay. Finally, milling can provide raw material that can be reclaimed for use in the production of new paving materials.

A milling machine includes a milling drum with a plurality of cutter teeth mounted thereon which is contained within a milling drum housing. The milling machine is adapted to be advanced across a road surface to "mill" the surface to remove asphaltic or Portland cement concrete pavement in preparation for recycling the pavement and/or in preparation for applying a pavement overlay. The typical milling machine includes one or more conveyors to take the milled material from the vicinity of the milling drum and direct it away from the machine and into an adjacent dump truck. A road stabilizer/reclaimer machine is similar to a milling machine in that it comprises a wheeled or track-driven vehicle that includes a milling drum with a plurality of cutter teeth mounted thereon which is contained within a milling drum housing. However, the milling drum of a road stabilizer/reclaimer machine is generally employed to mill or pulverize an existing road bed or roadway to a greater depth than does a milling machine prior to repaving (usually called reclaiming) or prior to initial paving (usually called stabilizing), and it leaves the pulverized material in place.

Cold in-place recycling ("CIR") equipment can be used to repair damage to a roadway in a single pass, while reusing essentially all of the existing asphalt paving material. In the CIR process, damaged layers of asphalt pavement are removed. The removed material is processed and replaced on the roadway and then compacted. If a roadway has good structural strength, CIR can be an effective treatment for all types of cracking, ruts and holes in asphalt pavement. CIR can be used to repair asphalt roadways damaged by fatigue (alligator) cracking, bleeding (of excess asphalt cement), block cracking, corrugation and shoving, joint reflective cracking, longitudinal cracking, patching, polished aggregate, potholes, raveling, rutting, slippage cracking, stripping and transverse (thermal) cracking. The root cause of the pavement failure should always be investigated to rule out base failure. However, CIR can almost always be used when there is no damage to the base of the roadway. Generally, CIR is only half as expensive as hot mix paving (i.e., paving with new asphalt paving material) while providing approximately 80% of the strength of hot mix paving.

CIR can be carried out with the aid of a milling machine or a road stabilizer/reclaimer machine that has been modified by mounting an additive spray bar in the milling drum housing to inject asphalt cement into the milling drum housing. The asphalt cement is then thoroughly blended with the milled material by the milling drum and can be left in a windrow or fed by the milling machine's discharge conveyor directly into an asphalt paving machine. When the CIR process is carried out with only a milling machine or stabilizer/reclaimer and an asphalt paving machine, the asphalt cement component of the mixture must be supplied from a separate supply tank truck that is coupled to the modified milling machine or road stabilizer/reclaimer machine. The asphalt cement component is drawn directly from the tank on the supply truck and metered through a flow system that is mounted on the milling machine to the spray bar in the milling drum housing.

Sometimes the CIR process is carried out with a milling machine or stabilizer/reclaimer in train with a cold recycler machine such as the RT-500 that is made and sold by Roadtec, Inc. of Chattanooga, Tenn. The cold recycler machine may include a vibratory screen, a crusher, an onboard source of asphalt cement and a pugmill mixer. When the CIR process is carried out using a cold recycler machine, the recycled asphalt material that is milled by the milling machine is transferred to the vibratory screen and then to the crusher on the cold recycler machine, and the screened and crushed material is then mixed with asphalt cement from an onboard source in the pugmill. Because the onboard asphalt cement supply in a cold recycler machine is limited, it may be desirable to convey additional asphalt cement from a separate supply truck to the asphalt cement storage tank on the cold recycler machine, in order to insure that the CIR process can proceed without frequent stops to refill the asphalt cement storage tank on the cold recycler machine. In either configuration of the CIR equipment, the primary component of the new pavement is asphalt paving material that is already in place on the roadway. The only other component of the new pavement is the asphalt cement carried by the cold recycler machine and/or by the supply truck. Since the rate of advance of the equipment engaged in the CIR process is determined primarily by the rate of advance of the milling machine, it is common for all of the components of the CIR process except for the asphalt paving machine to be coupled together so as to move at the same rate during all phases of the CIR process. Such components are frequently referred to as a CIR train.

Asphalt cement performs best in the CIR process when it is applied at a temperature within the range of 300°-350° F. Although the asphalt cement supply truck is generally thermally insulated, it does not include any heating mechanism for maintaining the temperature of the asphalt cement as the CIR process is carried out. Consequently, the asphalt cement in the supply truck will begin to lose heat as soon as the truck leaves the asphalt cement supply terminal. If the CIR process is being carried out at a great distance from the asphalt supply terminal, the asphalt cement in the supply truck will have lost a significant part of its heat even before the CIR process is begun. Furthermore, the CIR process may begin at a time of day such that it cannot be completed during a single operating shift. When the temperature of the asphalt cement in the supply truck falls below about 290° F.-300° F. (depending on the type of asphalt cement), for whatever reason, its continued use will likely result in a repaired roadway of substandard quality.

It would be desirable if a method and apparatus could be provided that would allow the operation of a CIR train to proceed without concern for the loss of heat in the asphalt cement carried by the supply truck.

ADVANTAGES OF THE INVENTION

Among the advantages of a preferred embodiment of the invention is that it provides a method and apparatus that allows the CIR process to continue without concern for the loss of heat in the asphalt cement carried by the supply truck.

Other advantages and features of this invention will become apparent from an examination of the drawings and the ensuing description.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "coupled", "connected" and "interconnected", refer to a relationship wherein structures are secured or attached to one another either directly or indirectly through intervening structures, as well as both moveable and rigid attachments or relationships, unless specified herein or clearly indicated by context. The terms "operatively connected" and "operatively attached" describes such an attachment, coupling or connection that allows the pertinent structures to operate as intended by virtue of that relationship. The term "fluid communication" refers to such an attachment, coupling or connection that allows for flow of fluid from one such structure or component to or by means of the other.

The use of any and all examples or exemplary language (e.g., "such as" and "preferably") herein is intended merely to better illuminate the invention and the preferred embodiment thereof, and not to place a limitation on the scope of the invention. Nothing in the specification should be construed as indicating any element as essential to the practice of the invention unless so stated with specificity. Several terms are specifically defined herein. These terms are to be given their broadest reasonable construction consistent with such definitions, as follows:

The term "asphalt cement" includes asphalt cement of various types and formulations in liquid form, as well as foamed asphalt cement and asphalt cement emulsions.

The term "asphalt paving material" refers to a bituminous paving mixture that is comprised of asphalt cement and any of various aggregate materials, and which is used for paving purposes.

The term "milling machine" refers to a machine having a milling or working drum that is adapted to be placed into contact with a roadway or road base surface for removing a portion of the surface. The term "milling machine" includes but is not limited to machines that are sometimes referred to as road stabilizers and roadway reclaiming machines. The term "milling machine" also includes a CIR-modified milling machine, as hereinafter defined.

The term "CIR process" refers to a use of cold in-place recycling ("CIR") equipment to repair damage to a roadway, by removing damaged layers of asphalt pavement, processing the asphalt paving material so removed, replacing the removed and processed asphalt paving material onto the roadway, and compacting it.

The term "CIR-modified milling machine" refers to a milling machine which has been modified by the addition of an asphalt cement flow system including a spray assembly that is mounted in the milling drum housing to inject asphalt cement into the milling drum housing.

The term "CIR train" refers to a plurality of items of equipment including, but not limited to, an asphalt cement supply tank, a milling machine (which may or may not be a CIR-modified milling machine), which items of equipment are used, or intended to be used, in a CIR process. The asphalt cement supply tank in a CIR train will typically be mounted on an asphalt cement supply truck. A CIR train will typically also include an asphalt paving machine, although the asphalt paving machine may be employed at a time subsequent to the passage of the other components of the CIR train to pick up a windrow of asphalt paving material from the roadway.

The term "processing direction" refers to the primary direction of travel of a CIR train as it operates on a roadway.

The terms "front", "forward" and similar terms, when used with respect to a machine, an item of equipment or a device that is part of a CIR train or a component of such a machine, item of equipment or device, refer to a relative location or direction towards the leading end of the CIR train as it travels in the processing direction.

The term "rear", "behind" and similar terms, when used with respect to a machine, an item of equipment or a device that is part of a CIR train or a component of such a machine, item of equipment or device, refer to a relative location or direction towards the trailing end of the CIR train as it travels in the processing direction.

SUMMARY OF THE INVENTION

The invention comprises a method and apparatus for heating asphalt cement that is carried in an asphalt cement supply tank prior to the use of such asphalt cement in a CIR process. The apparatus comprises a heater for asphalt cement that is a part of a CIR train. More particularly, the invention comprises a heater that is intended to be interposed between the asphalt cement supply tank and the component of the CIR train that is dispensing asphalt cement to be mixed with recycled asphalt pavement material in the CIR process.

In a preferred embodiment of the invention, the heater is adapted to heat asphalt cement continuously as it is withdrawn from the asphalt cement supply tank, typically at a rate of 30-40 gallons/minute, and it is adapted to insure that the asphalt cement that is discharged from the heater is within a predetermined acceptable range of temperatures for use in the CIR process.

In order to facilitate an understanding of the invention, the preferred embodiments of the invention, as well as the best mode known by the inventor for carrying out the invention, are illustrated in the drawings, and a detailed description thereof follows. It is not intended, however, that the invention be limited to the particular embodiments described or to use in connection with the apparatus illustrated herein. Therefore, the scope of the invention contemplated by the inventor includes all equivalents of the subject matter described herein, as well as various modifications and alternative embodiments such as would ordinarily occur to one skilled in the art to which the invention relates. The inventor expects skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiments of the invention are illustrated in the accompanying drawings, in which like reference numerals represent like parts throughout, in which arrows marked with "AC" indicate the direction of flow of asphalt cement and arrows marked "AF" indicate the direction of flow of air and/or gases or combustion, and wherein.

DESCRIPTION OF THE PREFERRED EMBODIMENTS OF THE INVENTION

Figure 1:
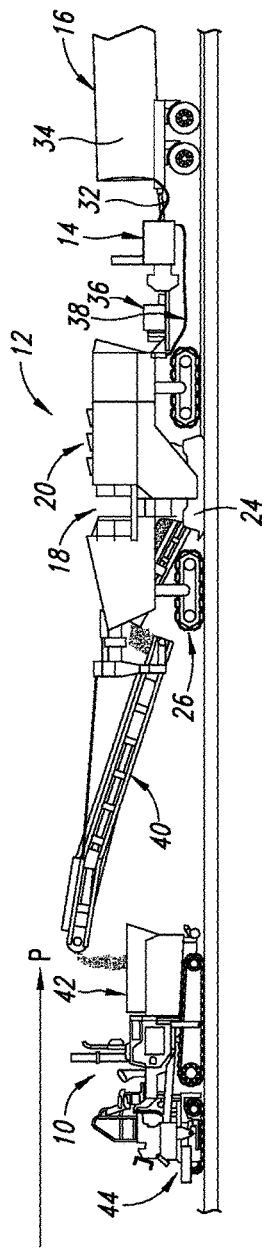
FIG. 1 is a side view of a CIR train comprised of an asphalt paving machine, a CIR-modified milling machine, a first embodiment of a heater for asphalt cement and an asphalt cement supply tank truck.

This description of preferred embodiments of the invention is intended to be read in connection with the accompanying drawings, which are to be considered part of the entire written description of this invention. The drawing figures are not necessarily to scale, and certain features of the invention may be shown exaggerated in scale or in somewhat schematic form in the interest of clarity and conciseness.

Figure 2:
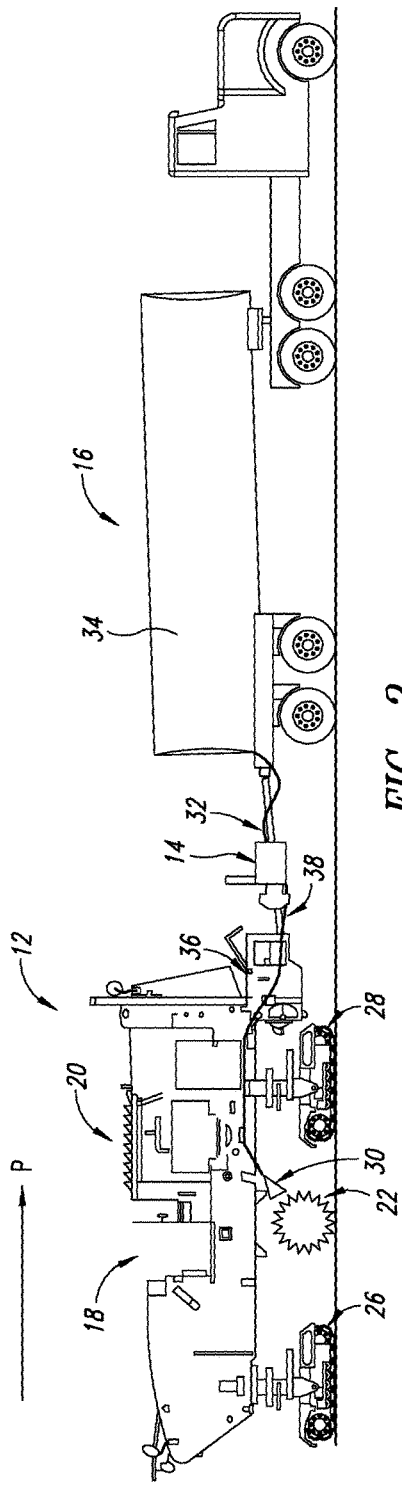
FIG. 2 is a side view of a portion of the CIR train of FIG. 1, shown from the opposite side from that of FIG. 1, with the CIR-modified milling machine illustrated somewhat schematically.
Figure 2A:
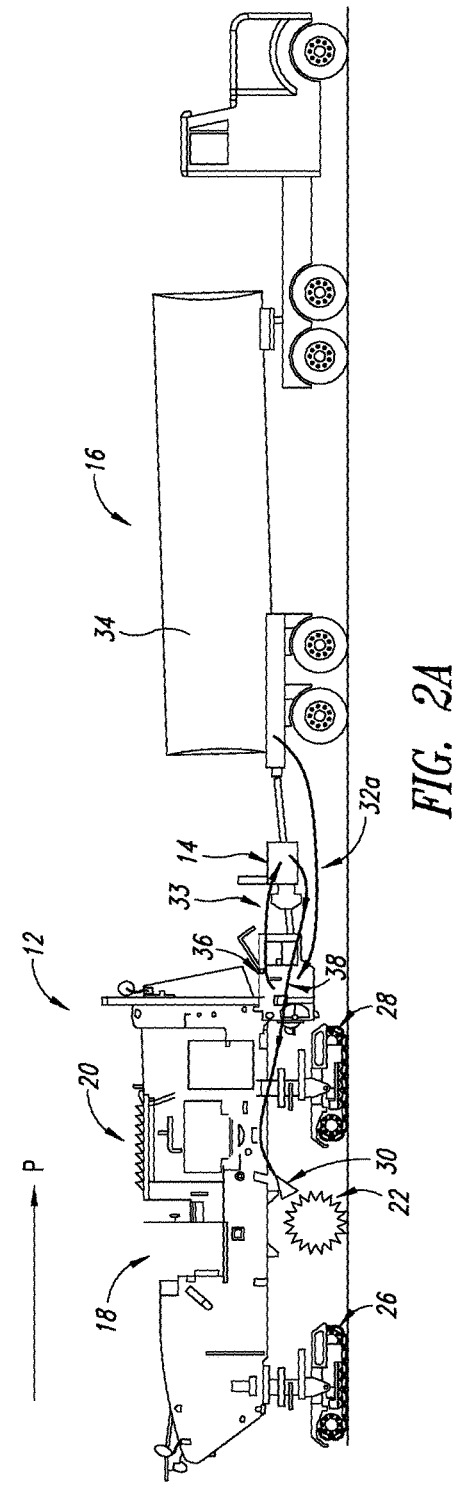
FIG. 2A is a side view of a portion of the CIR train that is similar to FIG. 2, showing an alternative flow pattern of asphalt cement from the asphalt cement supply tank truck to the milling drum housing of the CIR-modified milling machine.

FIGS. 1, 2 and 2A illustrate a first CIR train comprised of asphalt paving machine 10 (not shown in FIGS. 2 and 2A), CIR-modified milling machine 12, heater 14 and asphalt cement supply truck 16. CIR-modified milling machine 12 includes operator's station 18 and an engine, typically a diesel engine (not shown) that is enclosed in engine compartment 20. Power from the engine is transmitted by a drive belt (not shown), or other means known to those having ordinary skill in the art to which the invention relates, to milling drum 22, which is located in a conventional milling drum housing 24 (not shown in FIGS. 2 and 2A for clarity). Milling drum 22 includes a plurality of cutter teeth that are adapted to mill the road surface as the milling drum rotates and the machine is advanced along the roadway in the processing direction "P".

Power from the engine is also transmitted, by means known to those having ordinary skill in the art to which the invention relates, to rear track drive assembly 26 and front track drive assembly 28. CIR-modified milling machine 12 may include one or two rear drive track assemblies, each of which can be turned to the left and to the right for steering purposes. Most commonly, these rear drive track assemblies can also be raised and lowered relative to the machine main frame. Typically, there are also two front drive track assemblies (such as assembly 28), each of which can be turned to the left and to the right for steering purposes, and each of which can also be raised and lowered relative to the machine main frame. Other embodiments of CIR-modified milling machines (not shown in the drawings) may include wheel drive assemblies instead of track drive assemblies. Operator's station 18 includes all of the controls necessary for driving and steering the CIR-modified milling machine, rotating milling drum 22, and controlling all other operations of milling machine 12.

CIR-modified milling machine 12 includes asphalt cement spray assembly 30 that is mounted within the milling drum housing and adapted to dispense asphalt cement obtained from input supply line 32 which is in fluid communication with supply tank 34 on asphalt cement supply truck 16. Asphalt cement metering flow mechanism 36 is mounted on the front end of milling machine 12 and is in fluid communication with output supply line 38, heater 14 and input supply line 32 from supply truck 16. Flow mechanism 36 comprises a pump that operates to draw asphalt cement from supply tank 34 of supply truck 16, through input supply line 32 into heater 14, and out of heater 14 through output supply line 38 to spray assembly 30, which dispenses asphalt cement into milling drum housing 24, where it mixes with milled material. An alternative flow pattern of asphalt cement from asphalt cement supply tank truck 16 to milling drum housing 24 of the CIR-modified milling machine is illustrated in FIG. 2A. As shown therein, flow mechanism or pump 36 operates to draw asphalt cement from supply tank 34 of supply truck 16, through input supply line 32A to pump 36, and from pump 36 to heater 14 by heater input line 33, and from heater 14 to spray assembly 30 by output supply line 38.

The recycled asphalt paving mixture is then conveyed from milling drum housing 24 by conveyor 40 into hopper 42 at the front end of asphalt paving machine 10. Paving machine 10 includes a conventional conveyor system comprising longitudinally disposed conveyors (not shown) and a transversely disposed screw auger (also not shown) for delivering the recycled asphalt paving material from hopper 42 to a position just in advance of floating screed 44 where it is discharged onto the surface to be paved. The screed compacts and levels the asphalt mat on the repaired roadway.

Figure 3:
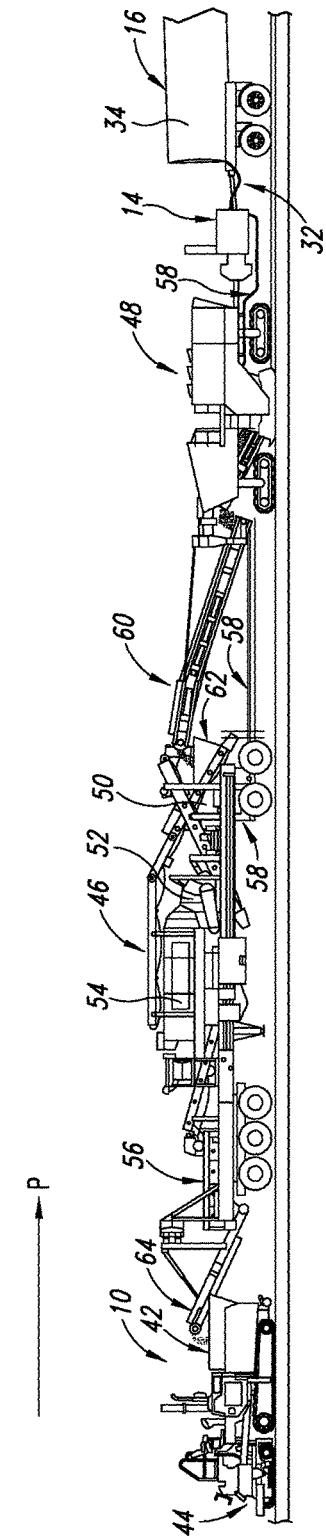
FIG. 3 is a side view of a CIR train comprised of an asphalt paving machine, a cold recycler machine, a milling machine, a first embodiment of a heater for asphalt cement and an asphalt cement supply truck.

FIG. 3 illustrates a second embodiment of a CIR train that is adapted to traverse the roadway in the processing direction "P", recycling and repairing the asphalt pavement in a single pass. This CIR train is comprised of conventional asphalt paving machine 10, cold recycler machine 46, milling machine 48, heater 14 and asphalt cement supply truck 16. Cold recycler machine 46 includes asphalt cement storage tank 50, crusher 52, screen assembly 54 and pugmill 56. Milling machine 48 is a conventional milling machine. A pump (not shown) connected to asphalt cement storage tank 50 operates to draw asphalt cement from supply tank 34 of supply truck 16, through input supply line 32 into heater 14, and out of heater 14 through output supply line 58 to asphalt cement storage tank 50 on cold recycler machine 46. Milling machine 48 mills asphalt pavement material from the roadway and conveys it via conveyor 60 into input hopper 62 on cold recycler machine 46. The material milled by the milling machine is then processed by cold recycler machine 46 by means of crusher 52 and screen assembly 54, and is conveyed into pugmill 56. Asphalt cement from asphalt cement storage tank 50 is also conveyed to and dispensed into pugmill 56 and mixed therein with the processed milled material. Recycled asphalt paving material mixed in the pugmill is then conveyed by conveyor 64 into hopper 42 at the front end of asphalt paving machine 10. The internal conveyor system in conventional paving machine 10 delivers the recycled asphalt paving material from hopper 42 to a position just in advance of floating screed 44 where it is discharged onto the surface to be paved. Screed 44 compacts and levels the asphalt mat on the repaired roadway.

Figure 4:
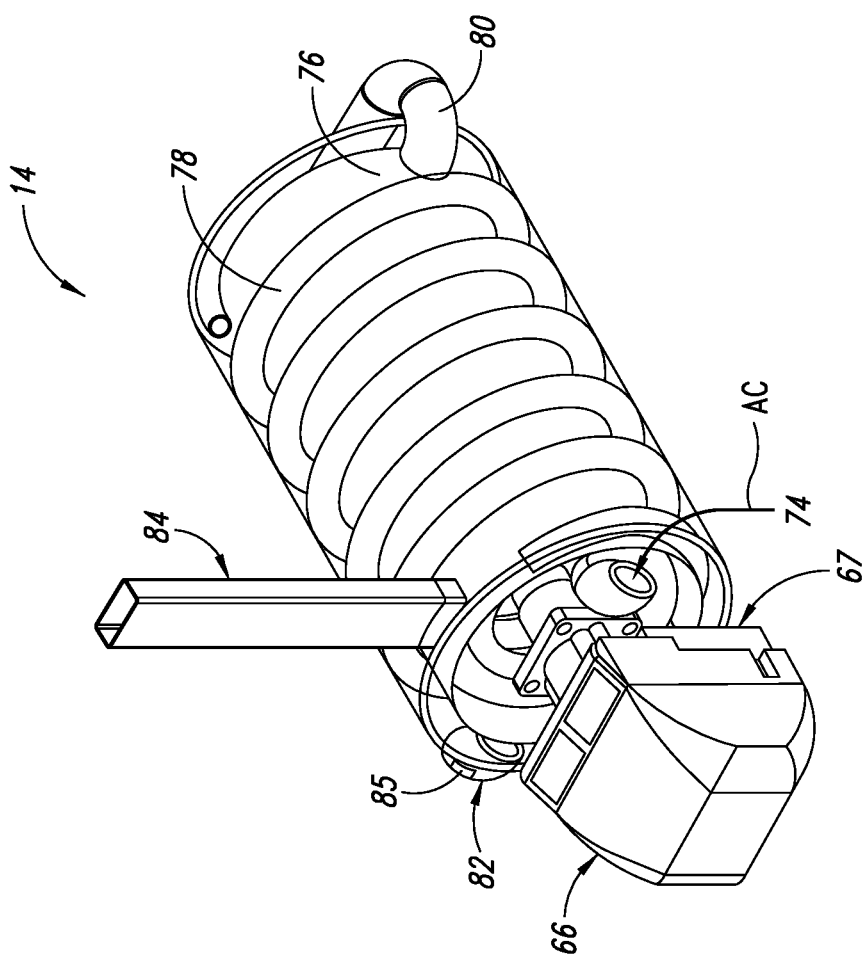
FIG. 4 is a perspective view of a first embodiment of the heater of the invention, with the outer wall removed to show certain details.
Figure 5:
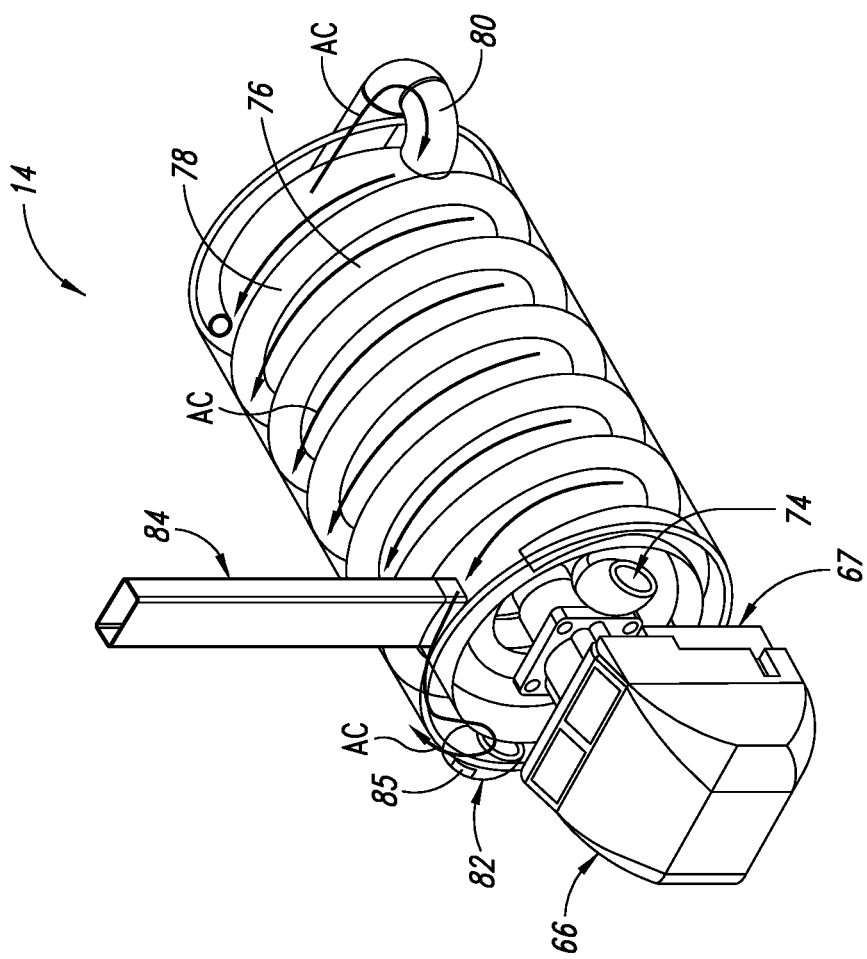
FIG. 5 is a perspective view of the first embodiment of the heater shown in FIG. 4, with the outer wall removed to show certain details, and illustrating the flow pattern of asphalt cement therethrough.
Figure 6:
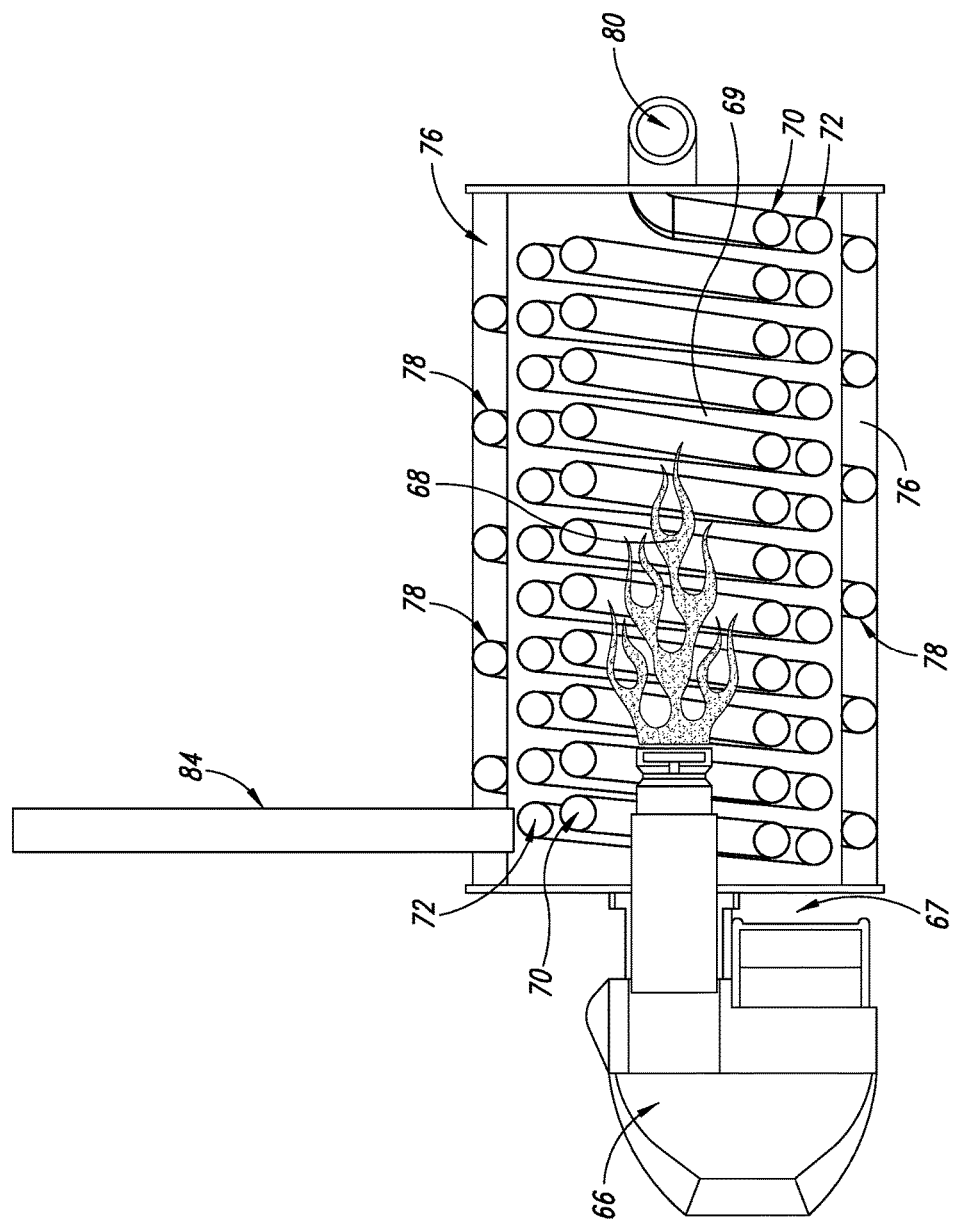
FIG. 6 is a sectional side view of the first embodiment of the heater shown in FIGS. 4 and 5.

Heater 14, comprising a first embodiment of a heater that may be employed in the invention, is illustrated in some detail in FIGS. 4-6. As shown therein, burner assembly 66 is adapted to burn diesel fuel, propane or another fuel with air drawn through air inlet 67 by an internal fan or blower (not shown) in order to create flame 68 (best shown in FIG. 6) and hot gases of combustion that are directed into a heating area within heating chamber 69 that is defined by inner coil 70 and intermediate coil 72, which are disposed around the periphery of the heating chamber. Asphalt cement is drawn from supply tank 34 of supply truck 16 through input supply line 32 into heater inlet 74. The flow is split and directed into inner coil 70 and intermediate coil 72 and flows through both coils which are wrapped around heating chamber 69 throughout its length. Surrounding the interior heating chamber 69 is helical passage 76 which is defined in part by guide wall 78. In the embodiment of the invention shown in FIGS. 4-6, guide wall 78 is in the form of a plugged, helical pipe, although it may be provided in the form of a helically oriented wall that wraps around interior heating chamber 69 so as to provide outer helical channel 76 for partially heated asphalt cement. Asphalt cement that has passed through either of inner coil 70 or intermediate coil 72 along the length of heating chamber 69 is then directed from inner outlet 80 into outer helical channel 76 where it is directed by guide wall 78 to flow around and along the length of the heating chamber. Heated asphalt cement from outer helical channel 76 is conveyed away from heater 14 though outlet 82, which is in fluid communication with output supply line 38 (FIGS. 1 and 2) or output supply line 58 (FIG. 3). Exhaust gases from interior heating chamber 69 are vented out of heater 14 through exhaust vent 84, which is in fluid communication with the interior heating chamber, as best shown in FIG. 6.

Burner assembly 66 is preferably a modulating burner assembly that includes a temperature control mechanism which is adapted to control the rate of feed of fuel to the burner assembly based upon a temperature of asphalt cement obtained by temperature sensor 85 in outlet 82. Such a burner assembly may comprise a light oil burner from the Idea (LO) series that is manufactured by C.I.B. Unigas S.p.A. of Campodarsego (PD), Italy. However, many burner assemblies known to those having ordinary skill in the art may be employed in heater 14.

Figure 7:
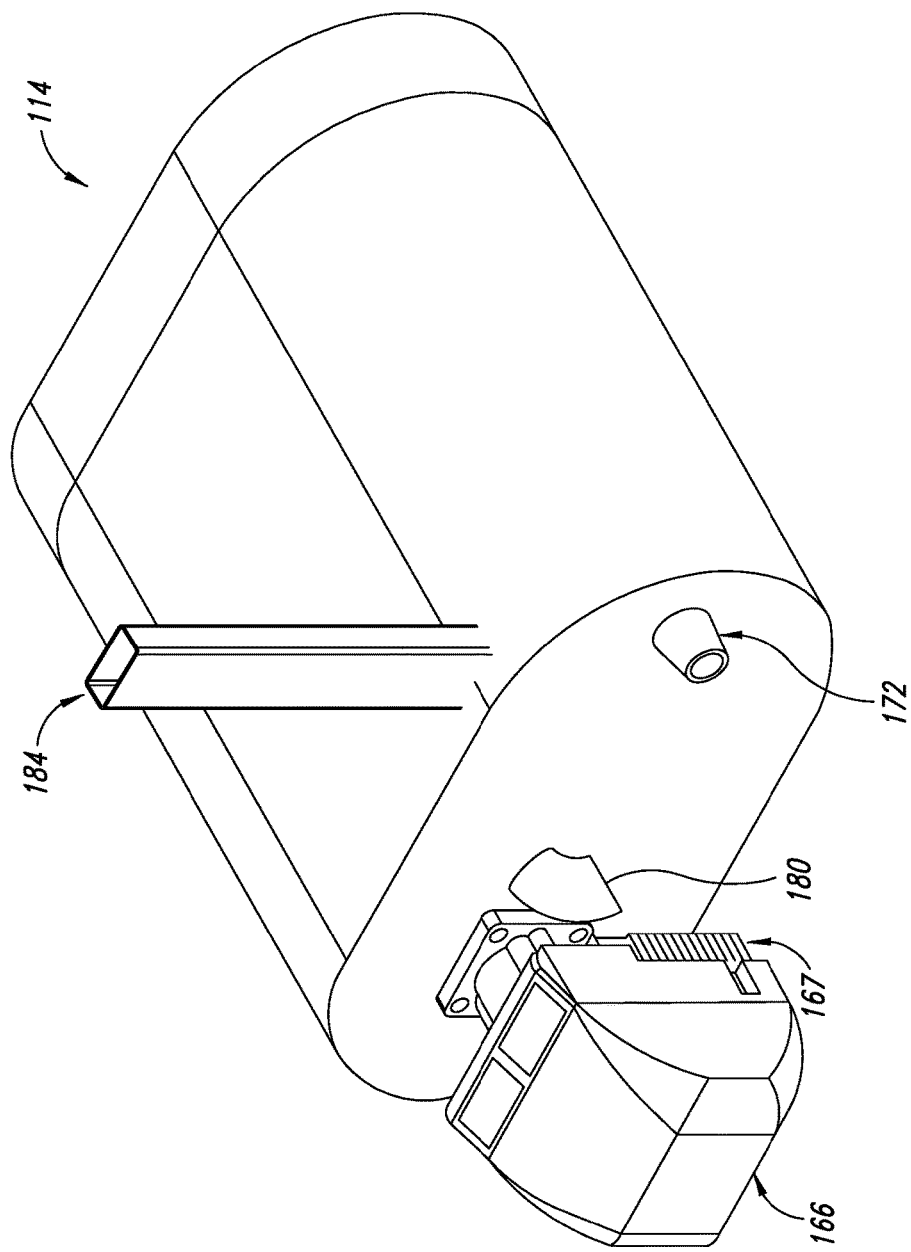
FIG. 7 is a perspective view of a second embodiment of the heater of the invention.
Figure 8:
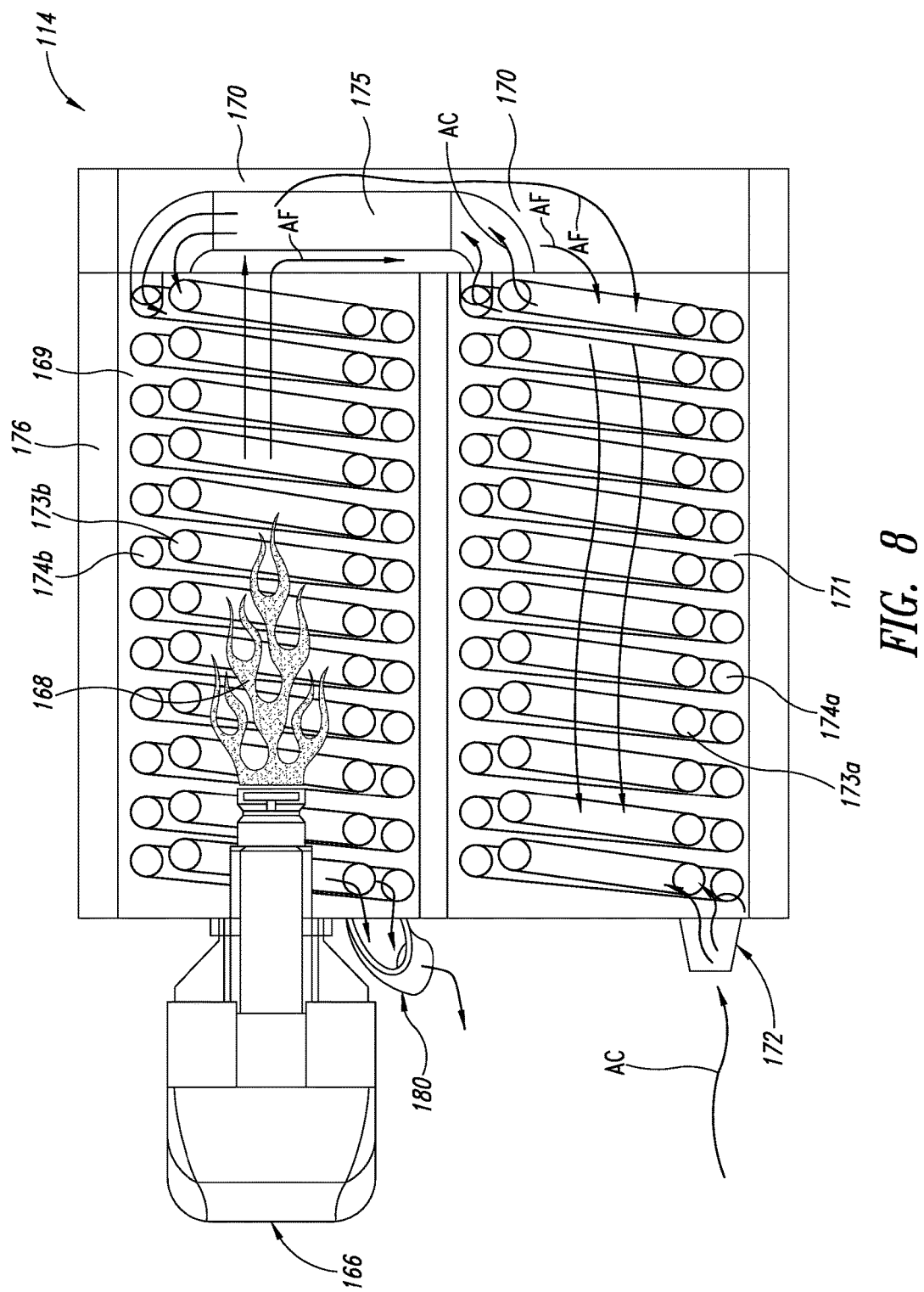
FIG. 8 is a sectional top view of the second embodiment of the heater shown in FIG. 7, illustrating the flow pattern of asphalt cement and heated air therethrough.

A second embodiment of the heater, heater 114, is illustrated in some detail in FIGS. 7 and 8. As shown therein, burner assembly 166 is adapted to burn diesel fuel, propane or another fuel with air drawn through air inlet 167 by an internal fan or blower (not shown) in order to create flame 168 (shown in FIG. 8), and hot gases of combustion that are directed into a heating area within first heating chamber 169, then into connecting flue 170 and into a heating area within second heating chamber 171. Exhaust from second heating chamber 171 passes out of heater 114 through exhaust vent 184. Asphalt cement is drawn from supply tank 34 of supply truck 16 through input supply line 32 into heater inlet 172. The flow is split and directed into first inner coil 173a and first outer coil 174a and flows through both coils which are wrapped around second heating chamber 171 throughout its length so as to define a portion of the heating area within second heating chamber 171. Partially heated asphalt cement passes out of first inner coil 173a and first outer coil 174a into conduit 175, which conveys it to second inner coil 173b and second outer coil 174b. The flow is split so as to flow through second inner coil 173b and second outer coil 174b, each of which is wrapped around first heating chamber 169 throughout its length so as to define a portion of the heating area within the first heating chamber. Surrounding both heating chambers 169 and 171 is outer insulation chamber 176 which is packed with thermal insulation. Asphalt cement that has passed through either of second inner coil 173b or second outer coil 174b along the length of heating chamber 169 is then directed from outlet 180 into output supply line 38 (FIGS. 1 and 2) or output supply line 58 (FIG. 3).

Burner assembly 166 is preferably a modulating burner assembly that includes a temperature control mechanism which is adapted to control the rate of feed of fuel to the burner assembly based upon a temperature of asphalt cement obtained by a temperature sensor (not shown but substantially similar to temperature sensor 85 in burner 14) that is located in outlet 180. Such a burner assembly may comprise a light oil burner from the Idea (LO) series that is manufactured by C.I.B. Unigas S.p.A. of Campodarsego (PD), Italy. However, many burner assemblies known to those having ordinary skill in the art may be employed in heater 114.

Figure 10:
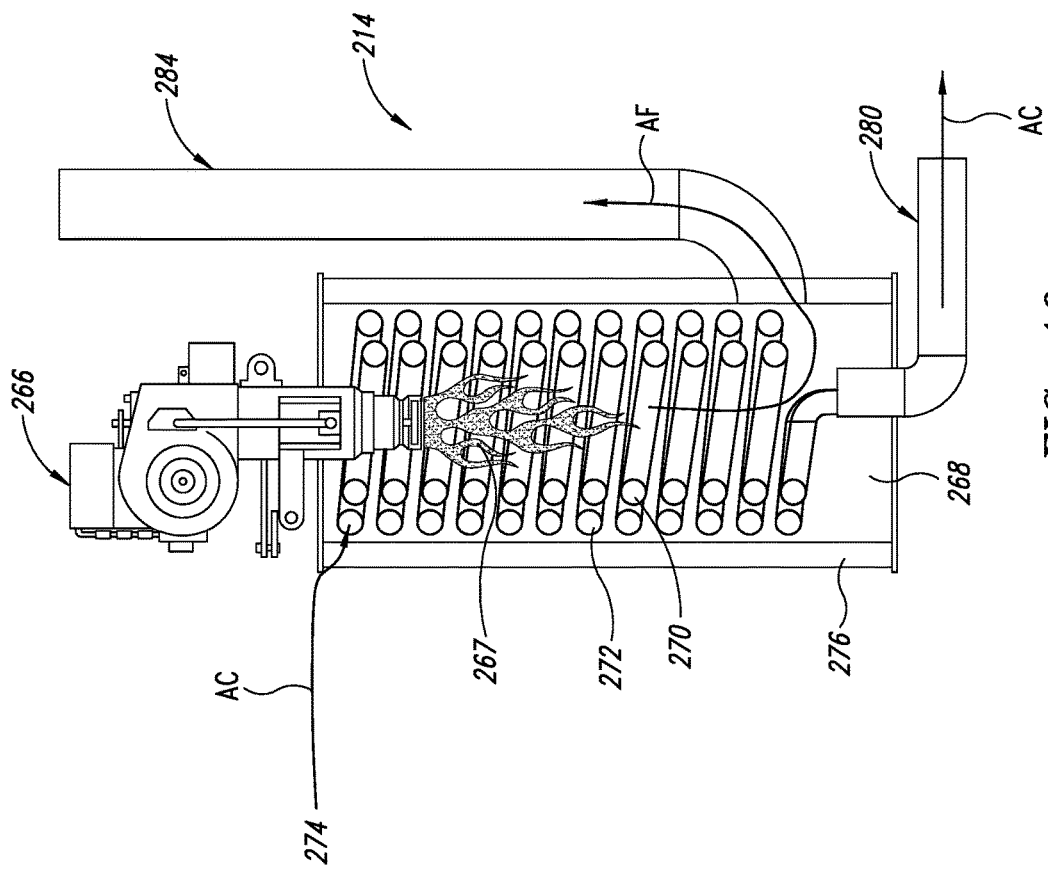
FIG. 10 is a sectional side view of the third embodiment of the heater shown in FIG. 9, illustrating the flow pattern of asphalt cement and heated air therethrough.
Figure 9:
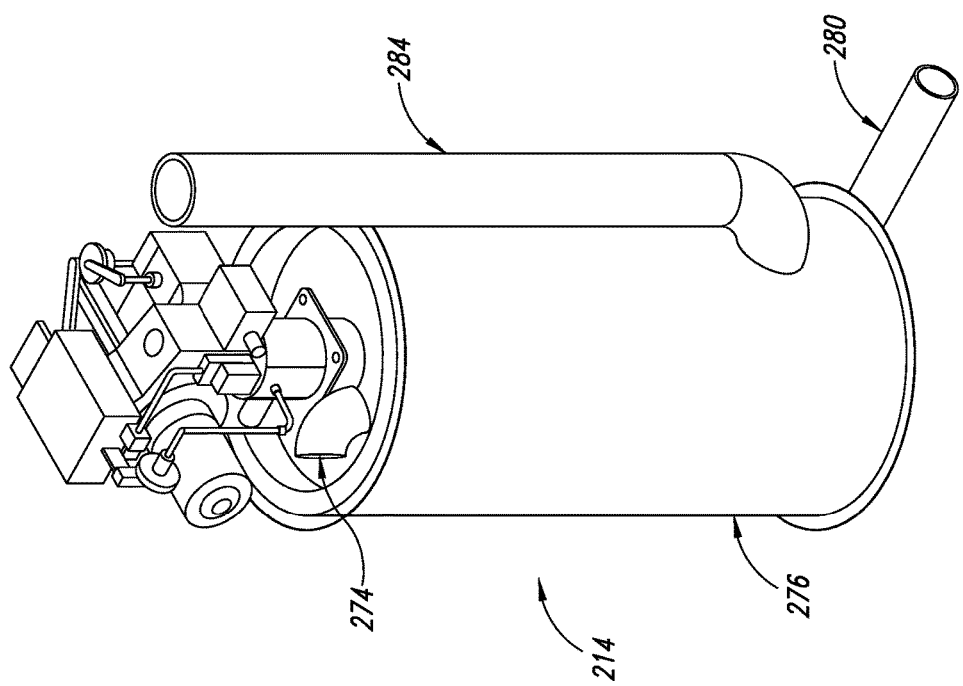
FIG. 9 is a perspective view of a third embodiment of the heater of the invention.

A third embodiment of the heater, heater 214, is illustrated in some detail in FIGS. 9 and 10. As shown therein, burner assembly 266 is adapted to burn diesel fuel, propane or another fuel with air drawn from outside the burner assembly by an internal fan or blower (not shown) to create flame 267 (shown in FIG. 10) and hot gases of combustion that are directed into a heating area of heating chamber 268 that is defined by and inside of inner coil 270 and outer coil 272, which coils are disposed around the periphery of the heating chamber. Asphalt cement is drawn from supply tank 34 of supply truck 16 through input supply line 32 into heater inlet 274. The flow is split and directed into inner coil 270 and outer coil 272 so that the asphalt cement flows through both coils, each of which is wrapped around heating chamber 268 throughout its length. Surrounding the interior heating chamber 268 is outer insulation layer 276 which provides thermal insulation for heater 214. Asphalt cement that has passed through either of inner coil 270 or outer coil 272 along the length of heating chamber 268 is then directed from outlet 280 into output supply line 38 (FIGS. 1 and 2) or output supply line 58 (FIG. 3). Exhaust gases from interior heating chamber 268 are vented out of heater 214 through exhaust vent 284, which is in fluid communication with the interior heating chamber, as shown in FIG. 10.

Burner assembly 266 is preferably a modulating burner assembly that includes a temperature control mechanism which is adapted to control the rate of feed of fuel to the burner assembly based upon a temperature of asphalt cement obtained by a temperature sensor (not shown but substantially similar to temperature sensor 85 in burner 14) that is located in outlet 280. Such a burner assembly may comprise a low $NO_x$ burner from the Mille series that is manufactured by C.I.B. Unigas S.p.A. of Campodarsego (PD), Italy. However, many burner assemblies known to those having ordinary skill in the art may be employed in heater 214.

Figure 11:
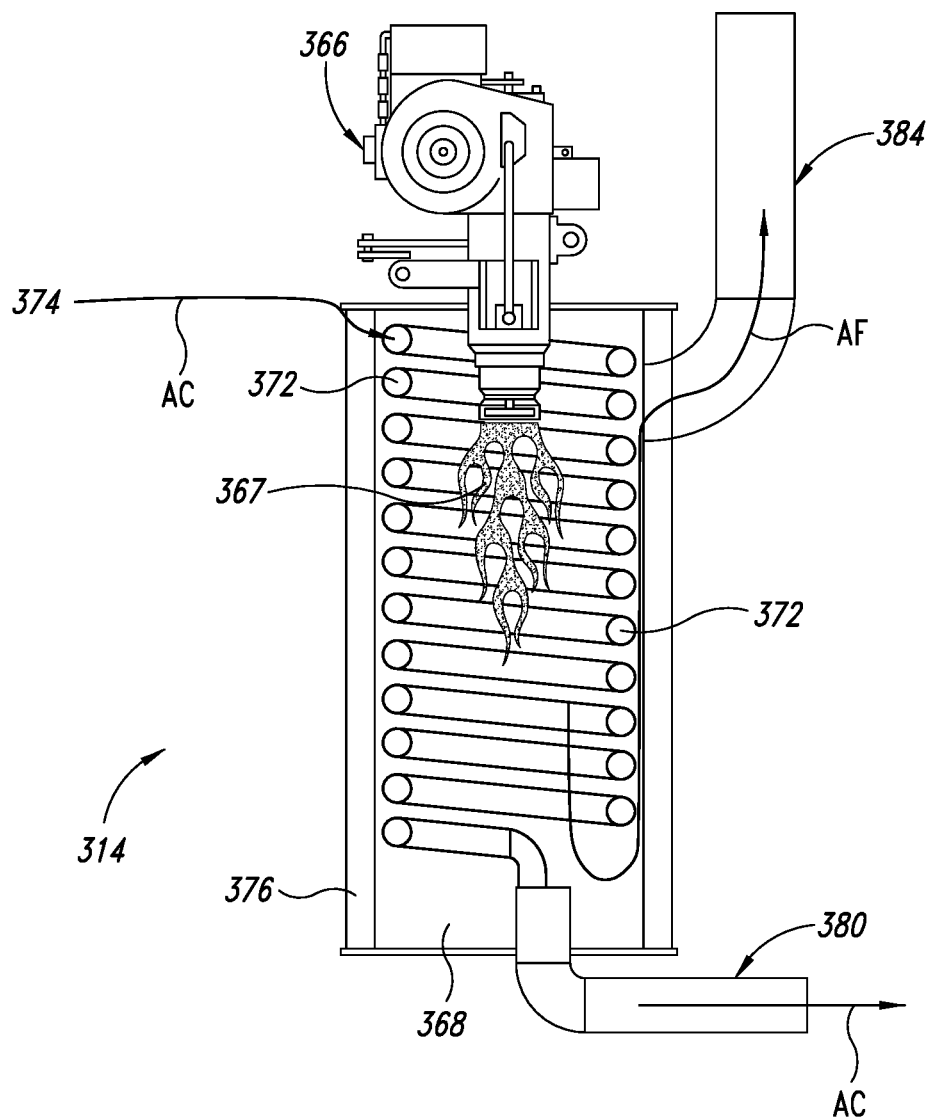
FIG. 11 is a sectional view of a fourth embodiment of the heater of the invention, illustrating the flow pattern of asphalt cement and heated air therethrough.
Figure 12:
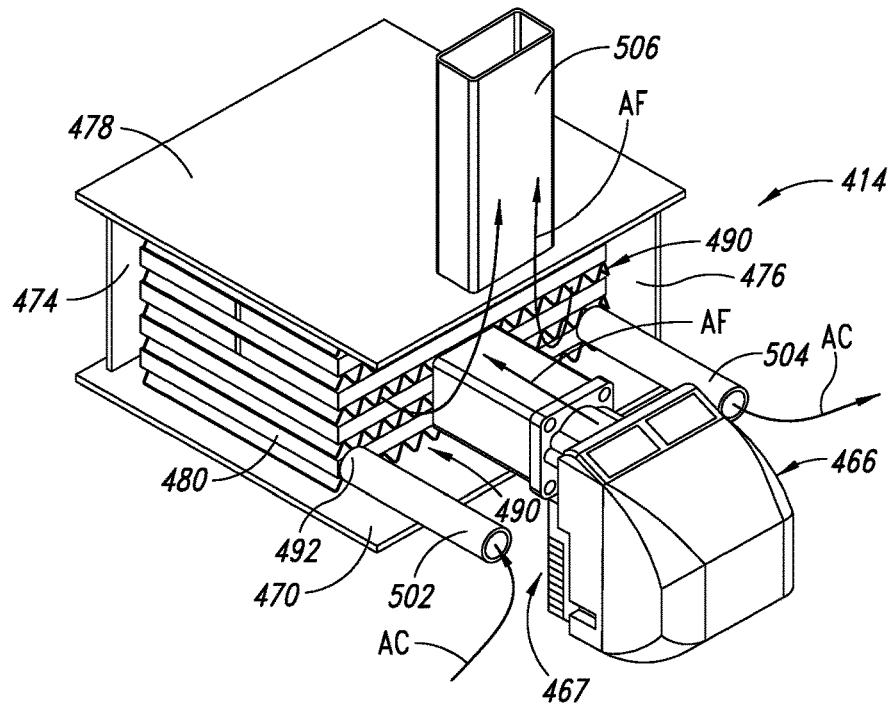
FIG. 12 is a perspective view of a fifth embodiment of the heater of the invention.
Figure 13:
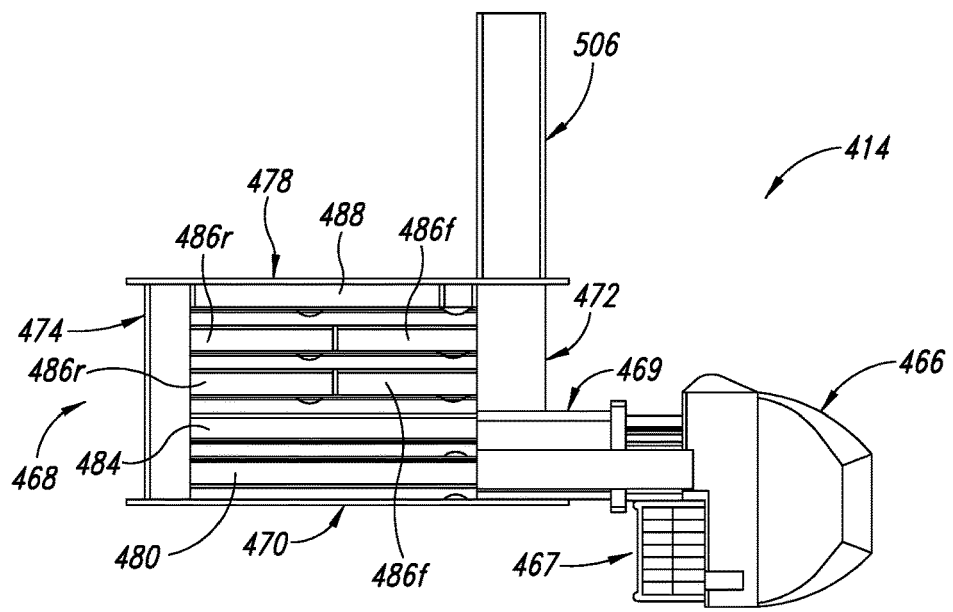
FIG. 13 is a sectional side view of the fifth embodiment of the heater shown in FIG. 12.
Figure 14:
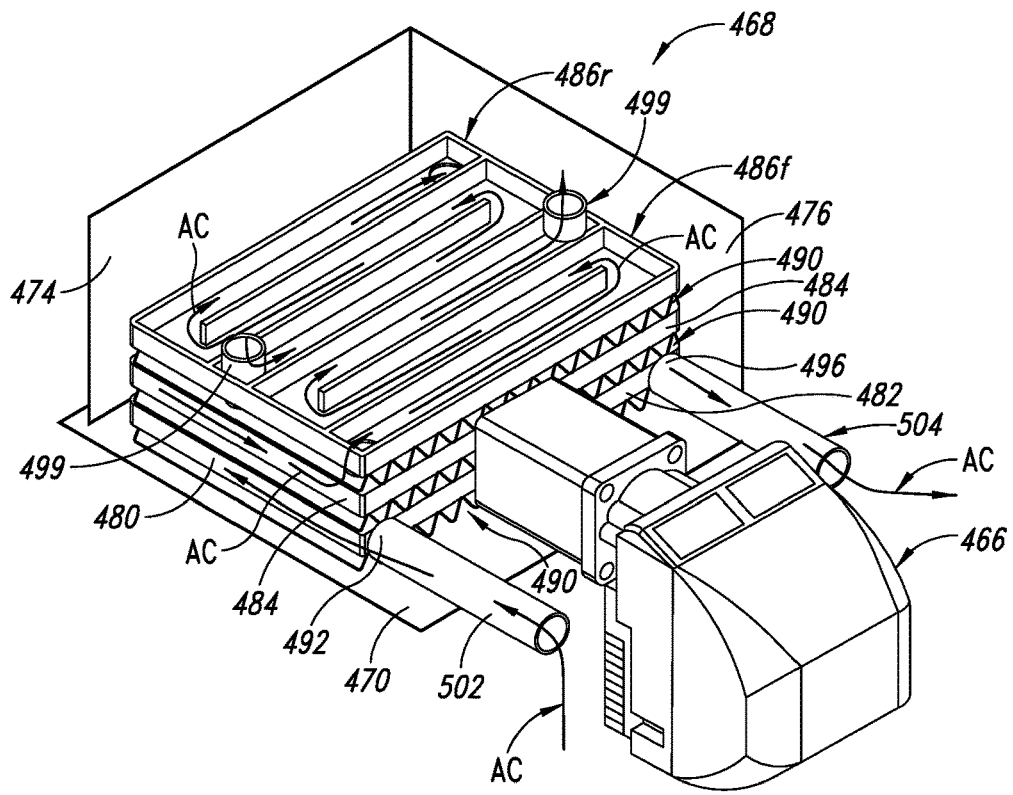
FIG. 14 is a perspective view of the fifth embodiment of the invention shown in FIGS. 12 and 13, with the top of the heater and the top asphalt flow plates removed to show the flow pattern of asphalt cement therethrough.
Figure 15:
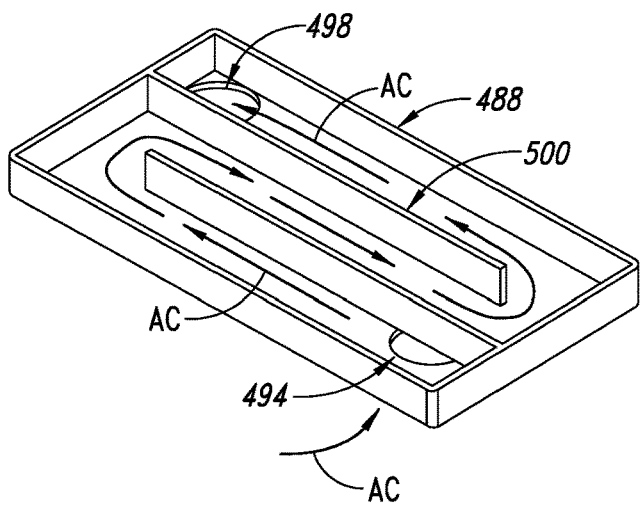
FIG. 15 is a perspective view of one of the top asphalt flow plates of the fifth embodiment of the invention shown in FIG. 14, illustrating the flow pattern of asphalt cement therein.
Figure 16:
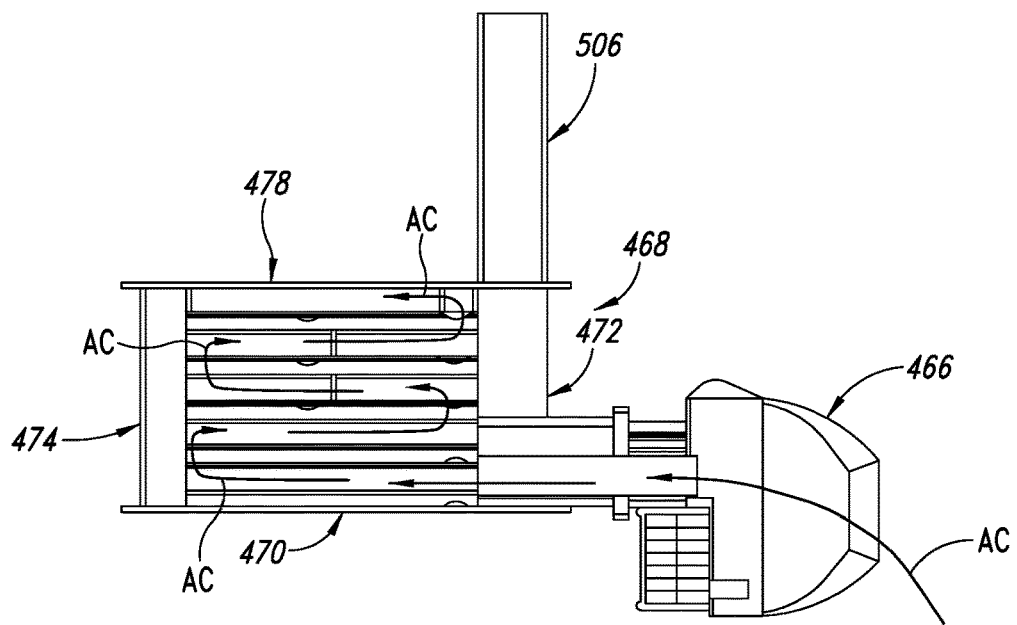
FIG. 16 is a sectional side view of the fifth embodiment of the invention shown in FIGS. 12-15, illustrating the flow pattern of asphalt cement therethrough.

A fourth embodiment of the heater, heater 314, is illustrated in some detail in FIG. 11. As shown therein, burner assembly 366 is adapted to burn diesel fuel, propane or another fuel with air drawn from outside the burner assembly by an internal fan or blower (not shown) to create flame 367 and hot gases of combustion that are directed into a heating area of heating chamber 368 that is defined by and inside of helical coil 372, which is disposed around the periphery of the heating chamber. Asphalt cement is drawn from supply tank 34 of supply truck 16 through input supply line 32 into heater inlet 374. The flow is directed into helical coil 372, which is wrapped around heating chamber 368 in a helical pattern throughout its length. Surrounding the interior heating chamber 368 is outer insulation layer 376 which provides thermal insulation for heater 314. Asphalt cement that has passed through helical coil 372 along the length of heating chamber 368 is then directed from outlet 380 into output supply line 38 (FIGS. 1 and 2) or output supply line 58 (FIG. 3). Exhaust gases from interior heating chamber 368 are vented out of heater 314 through exhaust vent 384, which is in fluid communication with the interior heating chamber.

Burner assembly 366 is preferably a modulating burner assembly that includes a temperature control mechanism which is adapted to control the rate of feed of fuel to the burner assembly based upon a temperature of asphalt cement obtained by a temperature sensor (not shown but substantially similar to temperature sensor 85 in burner 14) that is located in outlet 380. Such a burner assembly may comprise a low $NO_x$ burner from the Mille series that is manufactured by C.I.B. Unigas S.p.A. of Campodarsego (PD), Italy. However, many burner assemblies known to those having ordinary skill in the art may be employed in heater 314.

A fifth embodiment of the heater, heater 414, is illustrated in FIGS. 12-17. As shown therein, burner assembly 466 is adapted to burn diesel fuel, propane or another fuel with air drawn through air inlet 467 by an internal fan or blower (not shown) in order to create a flame (not shown, but substantially similar to flame 68 that is shown in FIG. 6) that is directed into a heating area within heating chamber 468 through flame tube 469. Heating chamber 468 is an enclosure comprised of floor 470, front panel 472, rear panel 474, a pair of side panels (only one of which, side panel 476, is shown in the drawings), and top panel 478 (not shown in FIG. 14). Disposed within the heating chamber are a plurality of asphalt cement flow plates, including inlet bottom flow plate 480 (not shown in FIG. 17), outlet bottom flow plate 482 (also not shown in FIG. 17), a pair of intermediate longitudinal flow plates 484, two pairs of intermediate transverse flow plates, with each such pair including a front flow plate 486f and a rear flow plate 486r, and a pair of upper flow plates 488. The asphalt cement flow plates are stacked atop each other and separated by corrugated spacers 490 (shown in FIGS. 12 and 14) which define a portion of the heating area within heating chamber 468. Heated air flow AF from burner assembly 466 flows within heating chamber 468 and through the corrugated spacers 490 in the pattern shown in FIGS. 12 and 17, transferring heat to the asphalt cement flow plates in the process.

Each asphalt cement flow plate preferably includes an asphalt cement inlet, such as inlet 492 in the front end wall of flow plate 480 or inlet 494 in the bottom of flow plate 488. Each asphalt cement flow plate preferably includes an asphalt cement outlet, such as outlet 496 in the front end wall of flow plate 482 or outlet 498 in the bottom of flow plate 488. Outlets of the asphalt cement flow plates on some levels are connected to inlets of asphalt cement flow plates on adjacent levels by connector pipes 499, and diverter walls 500 are provided to insure that the asphalt cement flows across a substantial portion of the surface area of each asphalt cement flow plate from the inlet to the outlet.

Figure 17:
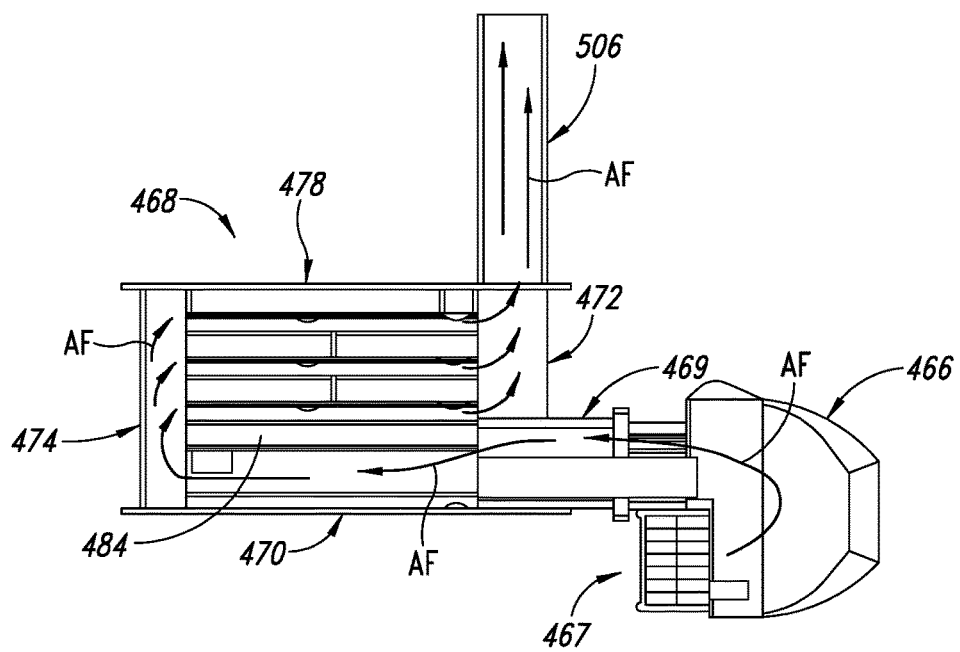
FIG. 17 is a sectional side view of the fifth embodiment of the invention shown in FIGS. 12-16, illustrating the flow pattern of air and hot gases of combustion therethrough.

Asphalt cement AC is drawn from supply tank 34 of supply truck 16 through input supply line 32 into heater inlet line 502, which is connected to inlet 492 in inlet bottom flow plate 480. The AC passes into, across and out of the asphalt flow plates, extracting heat from the hot gases of combustion AF from burner assembly 466. Eventually, heated AC from heating chamber 468 is conveyed away from heater 414 though outlet 504, which is in fluid communication with output supply line 38 (FIGS. 1 and 2) or output supply line 58 (FIG. 3). Exhaust gases AF from heating chamber 468 are vented out of heater 414 through exhaust vent 506, which is in fluid communication with the heating chamber, as best shown in FIG. 17.

Burner assembly 466 is preferably a modulating burner assembly that includes a temperature control mechanism which is adapted to control the rate of feed of fuel to the burner assembly based upon a temperature of asphalt cement obtained by a temperature sensor (not shown but substantially similar to temperature sensor 85 in burner 14) that is located in outlet 504. Such a burner assembly may comprise a light oil burner from the Idea (LO) series that is manufactured by C.I.B. Unigas S.p.A. of Campodarsego (PD), Italy. However, many burner assemblies known to those having ordinary skill in the art may be employed in heater 414.

Heaters 14, 114, 214 and 314 comprise coil-type heat exchangers that operate by moving asphalt cement through fluid passages comprising coils that are contacted by hot gases of combustion from a burner assembly. More particularly, heaters 14, 114, 214 and 314 include an enclosed fluid passage for asphalt cement comprising at least one coil that is in fluid communication with the heater inlet and the heater outlet and is disposed around the periphery of the heating chamber, said coil defining a heating area inside the coil with the heating chamber. In these heaters, the burner assembly is adapted and arranged to direct hot gases of combustion through the heating area inside the coil.

Similarly, heater 414 comprises a plate-type heat exchanger that operates by moving asphalt cement through fluid passages across plates that are contacted by hot gases of combustion from a burner assembly. More particularly, heater 414 comprises a plurality of asphalt cement flow plates which are stacked atop each other and separated by passages for hot gases of combustion. Each asphalt cement flow plate preferably includes an asphalt cement inlet and an asphalt cement outlet. Outlets of asphalt cement flow plates on some levels are connected to inlets of flow plates on adjacent levels by connector pipes, and diverter walls are provided to insure that the asphalt cement flows across a substantial portion of the surface area of each asphalt cement flow plate from the inlet to the outlet. The burner assembly is adapted to direct hot gases of combustion through the passages separating the asphalt cement flow plates in order to transfer heat to the asphalt cement thereon.

Other embodiments of heaters may be employed in the invention, including electric heaters and other heaters known to those having ordinary skill in the art to which the invention relates. Furthermore, in some embodiments of the invention, the heater may include a pump to provide, or to assist in providing, the necessary flow of asphalt cement through the heater.

Preferably, the invention employs a heater that is adapted to heat approximately 15-60 gallons/minute of asphalt cement, most preferably at least about 30 gallons/minute, so as to raise the temperature of the asphalt cement coming through input supply line 32 from supply tank 34 of supply truck 16 by approximately 30°-40° F. Preferably, the heater will produce at least about 300,000 BTUs per hour, most preferably about 500,000-750,000 BTUs per hour, and will provide continuous-flow heating of the asphalt cement. It is also preferred that the heater comprise as small a package as possible, and that the heater be provided with automatic temperature modulation using the asphalt cement temperature at the outlet as the feedback information for such modulation. When the heater includes a burner, temperature modulation may be accomplished by adjustments in fuel feed rate, fuel pressure and/or input air damping.

The heater is in fluid communication with a supply tank for asphalt cement and a mechanism for dispensing asphalt cement on recycled asphalt paving material removed from a roadway by a milling machine in a CIR process. The heater is adapted to heat the asphalt cement coming from the supply tank prior to its being dispensed on the recycled asphalt paving material that has been removed from the roadway. The heater may be a stand-alone unit interposed behind the asphalt cement supply truck, or it may be mounted to the asphalt cement supply truck, to a CIR-modified milling machine or to a cold recycler machine.

Although this description contains many specifics, these should not be construed as limiting the scope of the invention but as merely providing illustrations of the presently preferred embodiments thereof, as well as the best mode contemplated by the inventors of carrying out the invention. The invention, as described and claimed herein, is susceptible to various modifications and adaptations, as would be understood by those having ordinary skill in the art to which the invention relates.

What is claimed is:

1. A CIR train that is adapted to traverse a roadway of asphalt pavement in order to recycle and repair the asphalt paving material comprising the asphalt pavement, said CIR train comprising:
   (a) a milling machine for milling the asphalt paving material and removing said asphalt paving material from the roadway;
   (b) a vehicle comprising an asphalt cement supply tank;
   (c) a mechanism for dispensing asphalt cement onto asphalt paving material that has been removed from the roadway;
   (d) a heater that is in fluid communication with the asphalt cement supply tank and the mechanism for dispensing asphalt cement on the asphalt paving material that has been removed from the roadway, said heater:
      (i) being adapted to heat the asphalt cement from the asphalt cement supply tank prior to said asphalt cement being dispensed on the asphalt paving material that has been removed from the roadway;
      (ii) comprising a burner assembly that burns fuel in air to create hot gases of combustion;
      (iii) including a first heating chamber that includes a plurality of fluid passages through which asphalt cement may pass, which fluid passages are contacted by the hot gases of combustion from the burner assembly;
      (iv) including a second heating chamber that is disposed around the first heating chamber.

2. The CIR train of claim 1 wherein the mechanism for dispensing asphalt cement comprises an asphalt cement spray assembly that is mounted within the milling drum housing of a CIR-modified milling machine.

3. The CIR train of claim 1 wherein the mechanism for dispensing asphalt cement comprises dispensing the asphalt cement into a pugmill of a cold recycler machine.

4. The CIR train of claim 1 wherein the asphalt cement supply tank is mounted on an asphalt cement supply truck.

5. The CIR train of claim 1 wherein the heater is mounted between the milling machine and the asphalt cement supply tank.

6. The CIR train of claim 1 wherein the heater comprises:
(a) an outlet for heated asphalt cement;
(b) a temperature sensor that is located near the outlet for heated asphalt cement;
(c) a temperature control mechanism that is adapted to control the rate of feed of the fuel to the burner assembly based upon the temperature of asphalt cement obtained by the temperature sensor.

7. The CIR train of claim 1 wherein the heater is adapted to produce at least about 300,000 BTUs per hour.

8. The CIR train of claim 1 wherein the heater is adapted to provide continuous-flow heating of the asphalt cement coming from the asphalt cement supply tank.

9. The CIR train of claim 8 wherein the heater is adapted to heat at least about 30 gallons/minute of asphalt cement so as to raise the temperature of the asphalt cement coming from the asphalt cement supply tank by at least about 30° F.

10. The CIR train of claim 1 wherein:
(a) the heater comprises:
(i) said first heating chamber;
(ii) said second heating chamber;
(iii) a heater inlet for asphalt cement;
(iv) a heater outlet for asphalt cement;
(b) the plurality of fluid passages for asphalt cement comprises:
(i) a first coil that is in fluid communication with the heater inlet and is disposed around the periphery of the first heating chamber, said first coil defining a first heating area inside the first coil within the first heating chamber;
(ii) a second coil that is in fluid communication with the first coil and the heater outlet and is disposed around the periphery of the second heating chamber, said second coil defining a second heating area inside the second coil within the second heating chamber;
(c) wherein the asphalt cement is directed from the heater inlet into the first coil and the second coil to the heater outlet;
(d) wherein the first heating chamber is in fluid communication with the second heating chamber;
(e) wherein the burner assembly is arranged to direct the hot gases of combustion through the first heating area and the second heating area in order to transfer heat to the asphalt cement in the first coil and the second coil.

11. A CIR train that is adapted to traverse a roadway of asphalt pavement in order to recycle and repair the asphalt paving material comprising the asphalt pavement, said CIR train comprising:
(a) a milling machine for milling the asphalt paving material and removing said asphalt paving material from the roadway;
(b) a mobile support comprising an asphalt cement supply tank;
(c) a mechanism for dispensing asphalt cement onto the asphalt paving material that has been removed from the roadway;
(d) a heater that is in fluid communication with the asphalt cement supply tank and the mechanism for dispensing asphalt cement on the asphalt paving material that has been removed from the roadway, said heater being adapted to heat the asphalt cement from the asphalt cement supply tank prior to said asphalt cement being dispensed on the asphalt paving material that has been removed from the roadway, said heater further comprising:
(i) a heater inlet for asphalt cement;
(ii) a heater outlet for asphalt cement;
(iii) a heating chamber that includes a plurality of fluid passages through which asphalt cement may pass, said plurality of fluid passages comprising a first coil that is in fluid communication with the heater inlet through which a first portion of the asphalt cement is directed, and a second coil that is in fluid communication with the heater inlet through which a second portion of the asphalt cement is directed;
(iv) a burner assembly that burns fuel in air to create hot gases of combustion and is arranged to direct the hot gases of combustion through the heating chamber in order to transfer heat to the asphalt cement in the first and second coils.

12. A CIR train that is adapted to traverse a roadway of asphalt pavement in order to recycle and repair the asphalt paving material comprising the asphalt pavement, said CIR train comprising:
(a) a milling machine for milling the asphalt paving material and removing said asphalt paving material from the roadway;
(b) a wheeled chassis comprising an asphalt cement supply tank;
(c) a mechanism for dispensing asphalt cement onto asphalt paving material that has been removed from the roadway;
(d) a heater that is in fluid communication with the asphalt cement supply tank and the mechanism for dispensing asphalt cement on the asphalt paving material that has been removed from the roadway, said heater being adapted to heat the asphalt cement from the asphalt cement supply tank prior to said asphalt cement being dispensed on the asphalt paving material that has been removed from the roadway, said heater further comprising:
(i) a burner assembly that burns fuel in air to create hot gases of combustion;
(ii) a heater inlet for asphalt cement;
(iii) a heater outlet for asphalt cement;
(iv) a heating chamber that includes a fluid passage through which asphalt cement may pass, which fluid passage is contacted by the hot gases of combustion from the burner assembly, said fluid passage for asphalt cement further comprising an inner coil and an intermediate coil, both of which are in fluid communication with the heater inlet and are wrapped around the heating chamber to define a heating area inside the inner coil and the intermediate coil within the heating chamber;
(v) wherein the fluid passage for asphalt cement also comprises an outer helical channel which is outside of and in fluid communication with the inner coil and the intermediate coil, and is in fluid communication with the heater outlet;
(vi) wherein the asphalt cement is directed from the heater inlet into the inner coil and the intermediate coil and into the outer helical channel to the heater outlet;
(vii) wherein the burner assembly is arranged to direct the hot gases of combustion through the heating area inside the inner coil and the intermediate coil in order to transfer heat to the asphalt cement in the inner coil, the intermediate coil and the outer helical channel.

13. A CIR train that is adapted to traverse a roadway of asphalt pavement in order to recycle and repair the asphalt paving material comprising the asphalt pavement, said CIR train comprising:
(a) a milling machine for milling the asphalt paving material and removing said asphalt paving material from the roadway;
(b) a vehicle comprising an asphalt cement supply tank;
(c) a mechanism for dispensing asphalt cement onto asphalt paving material that has been removed from the roadway;
(d) a heater that is in fluid communication with the asphalt cement supply tank and the mechanism for dispensing asphalt cement on the asphalt paving material that has been removed from the roadway, said heater being adapted to heat the asphalt cement from the asphalt cement supply tank prior to said asphalt cement being dispensed on the asphalt paving material that has been removed from the roadway, said heater further comprising:
  (i) a burner assembly that burns fuel in air to create hot gases of combustion;
  (ii) a heater inlet for asphalt cement;
  (iii) a heater outlet for asphalt cement;
  (iv) a heating chamber that includes a fluid passage through which asphalt cement may pass, which fluid passage is contacted by the hot gases of combustion from the burner assembly, said fluid passage for asphalt cement further comprising an upper asphalt cement flow plate and a lower asphalt cement flow plate, wherein:
    (1) the upper asphalt cement flow plate is stacked atop the lower asphalt cement flow plate;
    (2) the upper asphalt cement flow plate is separated from the lower asphalt cement flow plate by a passage for hot gases of combustion;
    (3) the upper asphalt cement flow plate includes an upper asphalt cement inlet and an upper asphalt cement outlet;
    (4) the lower asphalt cement flow plate includes a lower asphalt cement inlet and a lower asphalt cement outlet;
    (5) the asphalt cement outlet of the lower asphalt cement flow plate is connected to the asphalt cement inlet of the upper asphalt cement flow plate by a connector pipe;
    (6) a diverter wall is provided on the upper asphalt cement flow plate to insure that the asphalt cement flows across a substantial portion of the surface area of the upper asphalt cement flow plate from the upper asphalt cement inlet to the upper asphalt cement outlet;
    (7) a diverter wall is provided on the lower asphalt cement flow plate to insure that the asphalt cement flows across a substantial portion of the surface area of the lower asphalt cement flow plate from the lower asphalt cement inlet to the lower asphalt cement outlet;
(e) the asphalt cement is directed to flow from the heater inlet across the lower asphalt cement flow plate and the upper outlet cement flow plate to the heater outlet;
(f) the burner assembly is adapted to direct hot gases of combustion through the passage separating the upper asphalt cement flow plate from the lower asphalt cement flow plate in order to transfer heat to the asphalt cement on the upper asphalt cement flow plate and the lower asphalt cement flow plate.

* * * * *